(No Model.)
C. BUCKEL.
TWO WHEELED VEHICLE.
No. 341,830. Patented May 11, 1886.
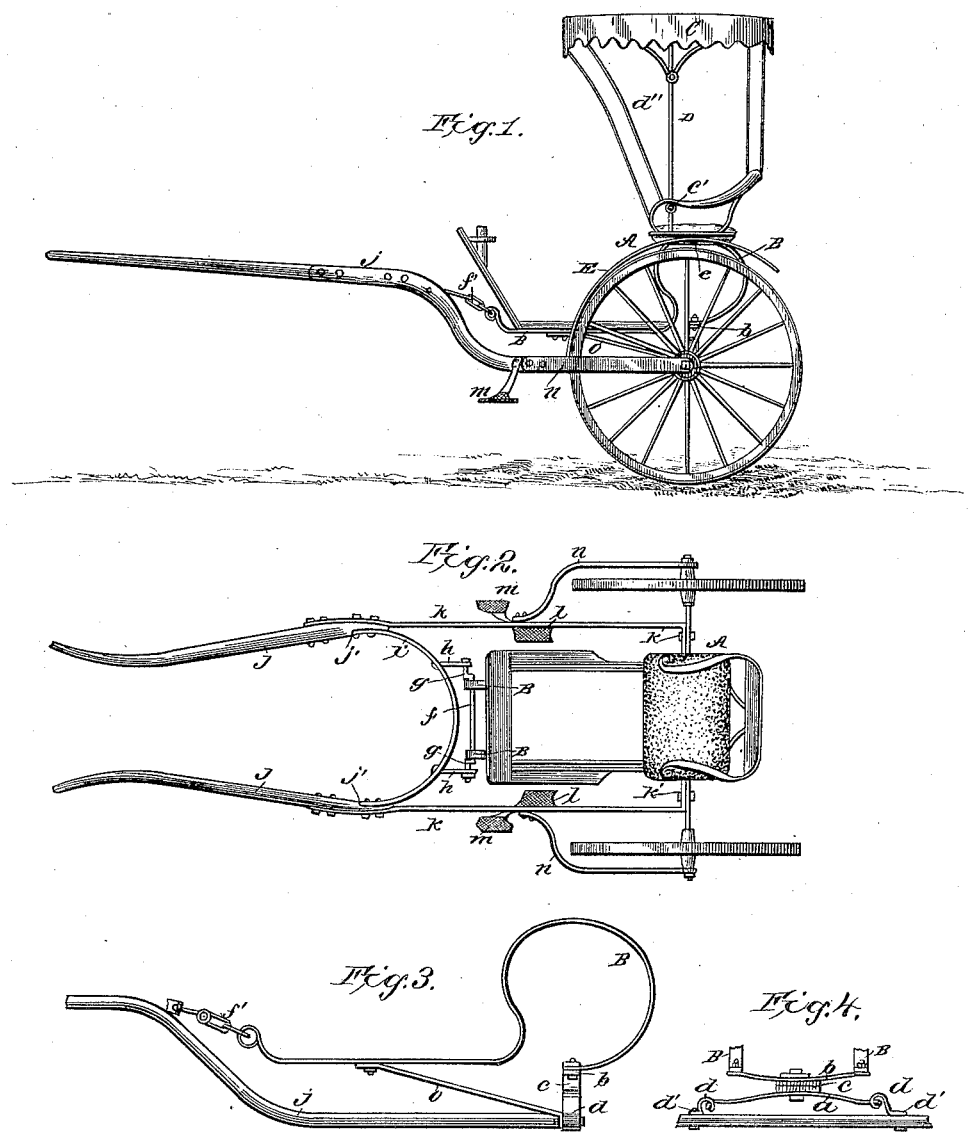
WITNESSES
Jos. A. Ryan
R. M. Campbell
Charles Buckel
INVENTOR
By Chas. E. Barber,
His Atty.

UNITED STATES PATENT OFFICE.

CHARLES BUCKEL, OF SAN ANTONIO, TEXAS.

TWO-WHEELED VEHICLE.

SPECIFICATION forming part of Letters Patent No. 341,830, dated May 11, 1886.

Application filed January 7, 1886. Serial No. 187,876. (No model.)

*To all whom it may concern:*

Be it known that I, CHARLES BUCKEL, a citizen of the United States, residing at San Antonio, in the county of Bexar, in the State of Texas, have invented certain new and useful Improvements in Spider-Gigs, of which the following is so full, clear, and exact description as will enable one skilled in the art to which my invention appertains to make and use the same, reference being had to the accompanying drawings, in which—

Figure 1 is a side view of my improved gig. Fig. 2 is a plan view of the same. Fig. 3 is a cross-section of Fig. 2 on the line $xx$. Fig. 4 is a detail end view of the rear of my gig, showing the cross-springs in position.

The object of my invention is to provide a gig which shall be cheap, simple in construction, light, and durable.

Another object of my invention is to provide a vehicle in which a person can ride over rough ground without serious inconvenience or discomfort incident to travel over such roads.

Still another object of my invention is to so construct a gig that a person can get into the same without serious inconvenience, and to this end it is made low, the rear of the shafts being extended in line with the axle and the step secured to the shaft and extending somewhat below it.

Still another object of my invention is to provide a gig with springs that will work in two directions—laterally and vertically.

With these objects in view I proceed to accomplish the same by the construction, combination, and arrangement of parts, as will be hereinafter fully set forth.

In the drawings, A represents the body of an ordinary gig, which is secured to the springs B, said springs extending in a downward curve from the seat to the axle, where they are secured to a second spring, $b$, being secured at its center to a third spring, $a$, having a packing, $c$, between the spring $b$ and $a$. The spring $a$ is secured to the curved arms or hooks $d$, and said hooks are bolted to the axle at $d'$. The spring B is bent downward in front of the axle and extends forward to a point in front of that portion of the box which would be occupied by the feet of a person riding in the gig. Here it extends upward in an oblique line and is secured to a rock-shaft, $f$. Said rock-shaft is provided with crank-arms $g$, which are pivotally journaled in the brackets or lugs $h$, and these brackets are secured to a bow cross-bar, $i$. The ends of this cross-bar are bolted to the shafts $j$, said shafts being recessed at $j'$, to make a smooth connection. On the outsides of the shafts $j$ we secure the shaft-irons $k$, which extend to the rear, and are secured to the axle beneath the seat of the gig at $k'$.

On the inside of the shaft-iron $k$, I secure the step $l$, and diagonally opposite this I secure the second step, $m$, which extends somewhat below the plane of the shaft. Just back of the step $m$, and between it and the axle, I secure a guard $n$, which extends backward to the axle, and is secured to it at the outer end of the hub of the wheel by the same nut which holds the wheel on the axle. Thus it will be seen that this nut performs the double purpose of holding the guard and wheel, while the guard serves the double purpose of holding the axle and shaft in position and of preventing the wheel from being damaged or from soiling the clothing of persons getting in and out of the gig.

Instead of the rock-shaft $f$, shown in Fig. 2, I might use links $f'$, as shown in Fig. 3, by pivoting the front ends of the springs B in these links and pivoting the links to the lugs $h$, as will be readily understood.

By reference to Fig. 3 it will be observed that a brace, $o$, extends from the axle to the springs B at a point about midway between the seat and the foot-rest of the body of the gig. This brace is designed to steady the body of the gig and to prevent its being overthrown by sudden jars caused by the stopping or starting of the horse or the jolting of the gig over rough ground.

It is noted here that the spring B is quite elastic just beneath the foot-rest in front of the vehicle, which admirably adapts it to use in this connection, as all jar is thus obviated.

By reference to Fig. 1 it will be observed that a canopy, C, is secured to the uprights or standards D, and is held in position by the strips or stays $d''$. This canopy is pivoted at $c'$, and is adjustable at any angle by means of the stays $d''$.

In front of the wheels I secure a secondary guard, E, the upper free end of which is secured to the seat at e, while the lower front end extends down in front of the wheel.

By reference to Fig. 4 it will be observed that the springs b and a, which are secured to the axle, support the ends of the large springs B B, and that the upper spring, b, is somewhat shorter than the spring a. This is of prime importance in this connection, as will be understood hereinafter.

I am aware that it is old to construct vehicles with springs and other modern appliances to make them comfortable.

I am aware also that it is old to construct gigs with two wheels; but the great disadvantage has been that these buggies and carts have been too expensive, and were too complicated to be within the reach of the masses, and I have endeavored in carrying out my invention to construct a gig which would be within the reach of all, and which would combine utility and simplicity.

It will be readily understood by those familiar with the use of gigs that the construction of the cross-bar and shafts is such that any unevenness of ground over which the gig may be drawn will not affect seriously the comfort of the occupant, as the curved cross-bar is elastic and will allow one end of the axle to extend above or below the other, and will bend enough to compensate for this motion without causing the back-pad or saddle to hurt the horse's back. The double spring in the rear also acts to counterbalance any unevenness in the road over which the vehicle is being drawn, the ends of the springs b, midway between the outer ends of the lower spring, a, and the point where the upper spring, b, is supported, causing the spring a to bend at its central point, and there is no liability of breaking a spring at its ends.

Having now fully described a preferred form of gig, what I wish to secure by Letters Patent and to claim is—

1. In a gig, the main springs B, provided with a brace, o, extending from said springs to the axle, in combination with the axle, the pivotal connecting-links, and the cross-bar secured to the shaft, substantially as described.

2. In a gig, the axle supporting the double springs b and a, in combination with the springs B, secured to the upper spring, b, and extending forwardly and supporting the body of the gig, substantially as described.

3. In a gig, the axle provided with the shaft-irons secured thereto, in combination with the curved elastic cross-bar, the body, and the springs, substantially as described.

4. In a gig, the axle provided with the shaft-irons secured thereto, and provided with the steps l and m, opposite each other, in combination with the shafts, the elastic cross-bar, the springs, and the body, substantially as described.

5. In a gig, the axle having secured thereto the springs and the shaft-irons, in combination with the guard n, the body, and the brace o, substantially as described.

6. In a gig of the character described, the axle having the shaft-irons secured thereto, the shafts and elastic cross-bar secured to the front end of the shaft-irons and provided with the lugs h, in combination with the rock-shaft, the springs b, the body, and the springs b and a, all constructed and combined to operate as and for the purpose set forth.

7. In a gig, the axle provided with the shaft-irons having the shafts and cross-bar secured thereto, and also having the steps l and m secured to the same on opposite sides, the latter extending below the plane of the step l, in combination with the guard n, secured to the shaft-iron and the axle by a nut, substantially as described.

In testimony whereof I affix my signature in presence of two witnesses.

CHARLES BUCKEL.

Witnesses:
JOHN H. COPELAND,
W. C. BERRY.